Inventor:
Leslie M. Hile
By Arthur F. Durand
Atty.

May 2, 1933. L. M. HILE 1,906,794
BASKET HANDLE MACHINE
Filed Aug. 28, 1931 4 Sheets-Sheet 4
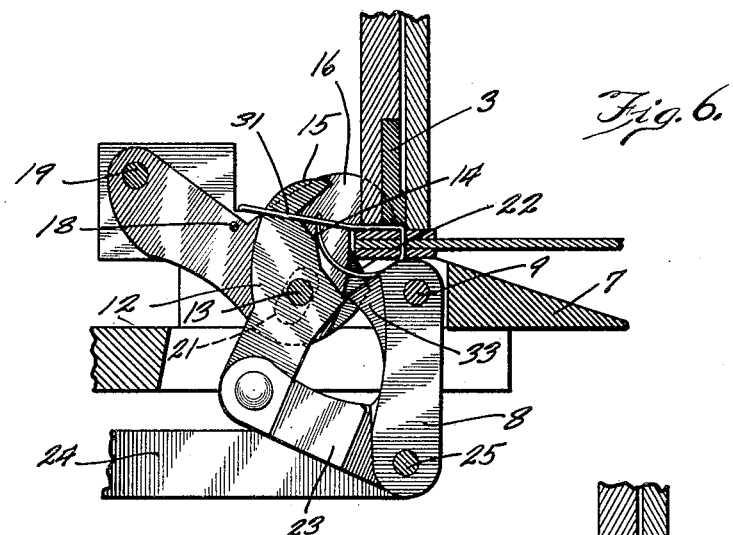
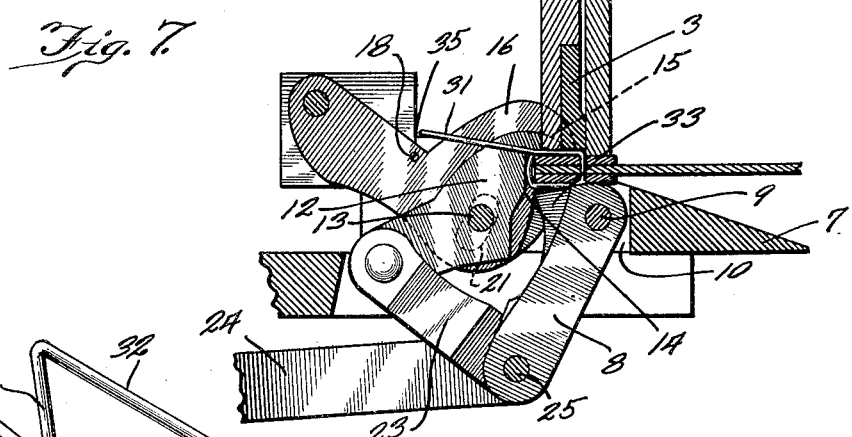
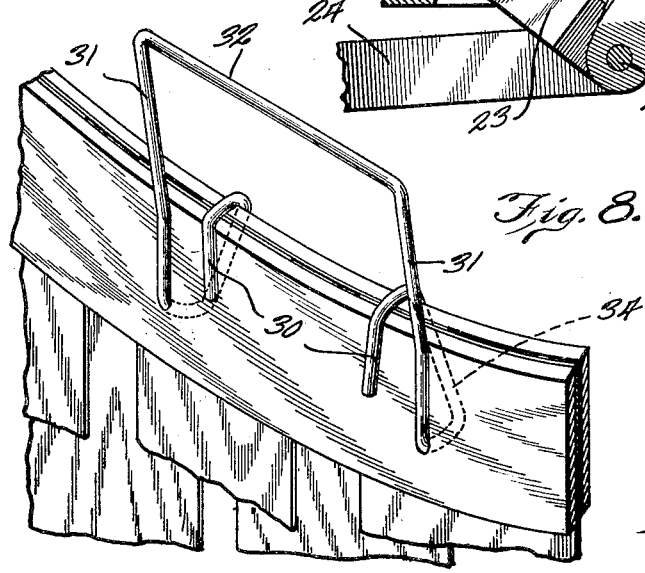
Inventor:
Leslie M. Hile Patented May 2, 1933

1,906,794

UNITED STATES PATENT OFFICE

LESLIE M. HILE, OF BENTON HARBOR, MICHIGAN

BASKET HANDLE MACHINE

Application filed August 28, 1931. Serial No. 560,041.

This invention relates to machinery for attaching wire handles to baskets, by bending the wire into bail-shaped form, then bending the end portions of the bail-shaped member or blank thus formed at right angles, and then inserting the bent end portions of the handle through the rim of the basket, and suitably bending or clinching the handle ends.

Generally stated, the object of the invention is to provide a novel and improved construction and arrangement whereby the handle is inserted through the rim of the basket, and whereby the end portions of the handle are then bent upwardly over the edge of the rim, and then downwardly, against the side of the basket rim, whereby the handle can be bent outwardly and then back again, as in attaching a basket cover, without danger of weakening the attachment of the handle to the basket, and without danger of injuring the fruit or other contents of the basket, the clinching mechanism being provided with means for effectively guiding the end portions of the handle into position to be bent over the edge of the basket rim, and finally against the side of the rim, and the clinched handle ends being spaced a distance from the legs or side portions of the handle, thereby to provide working room or space for certain elements of the clinching mechanism.

It is also an object to provide certain details and features of construction and combinations tending to increase the general efficiency and the desirability of a basket handle clinching mechanism of this particular character.

To the foregoing and other useful ends, the invention consists in matters hereinafter set forth and claimed, and shown in the accompanying drawings in which—

Fig. 6 is a similar view, showing the parts in position to partially bend or clinch the handle ends.

Fig. 7 is a similar view showing the parts in operative position to complete the bending or clinching of the handle ends.

Fig. 8 is a perspective of the finished handle, showing the adjacent portion of the basket to which the handle is attached.

Figure 1:
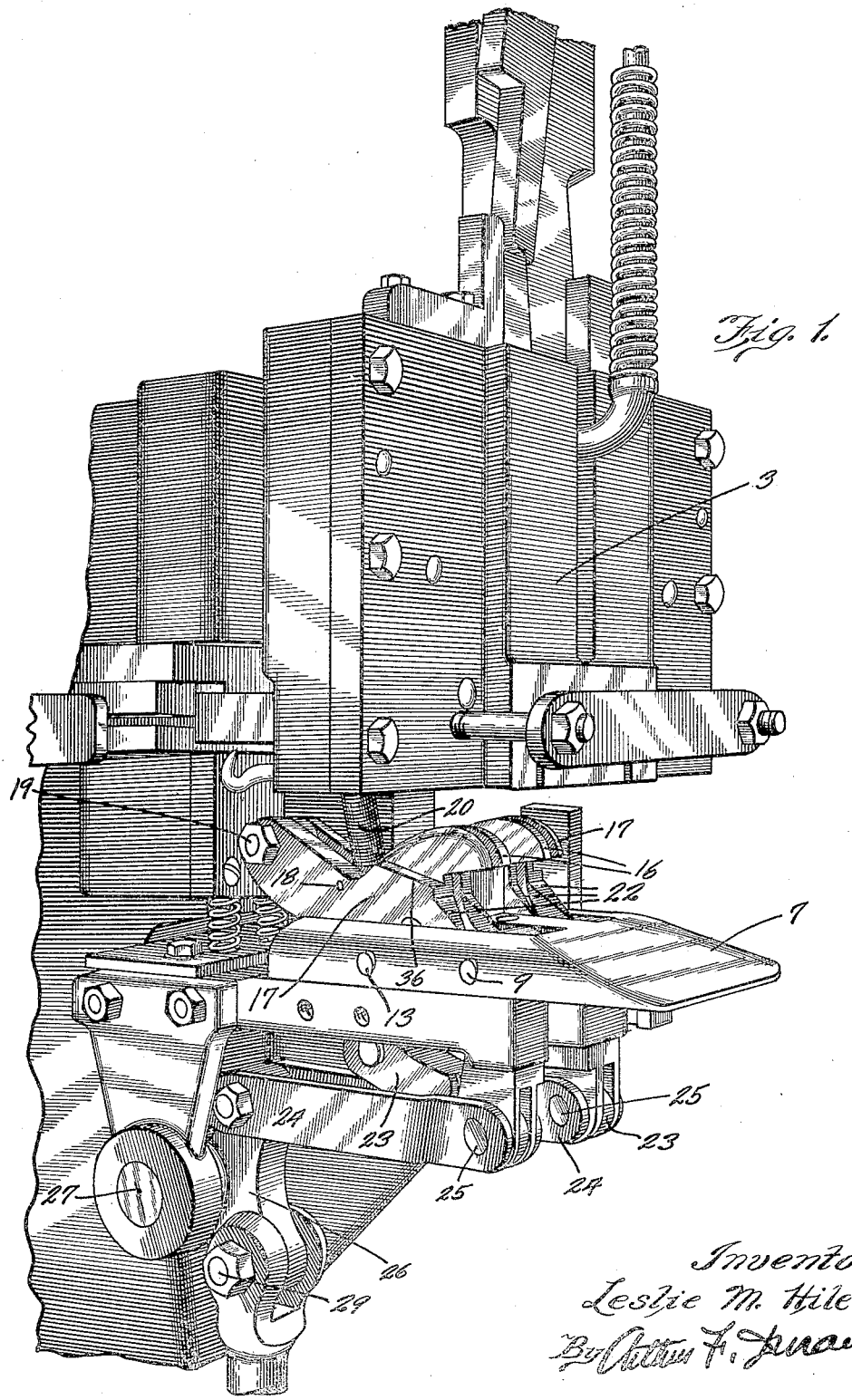
Fig. 1 is a perspective of the front portion of a machine having handle clinching mechanism embodying the principles of the invention.
Figure 2:
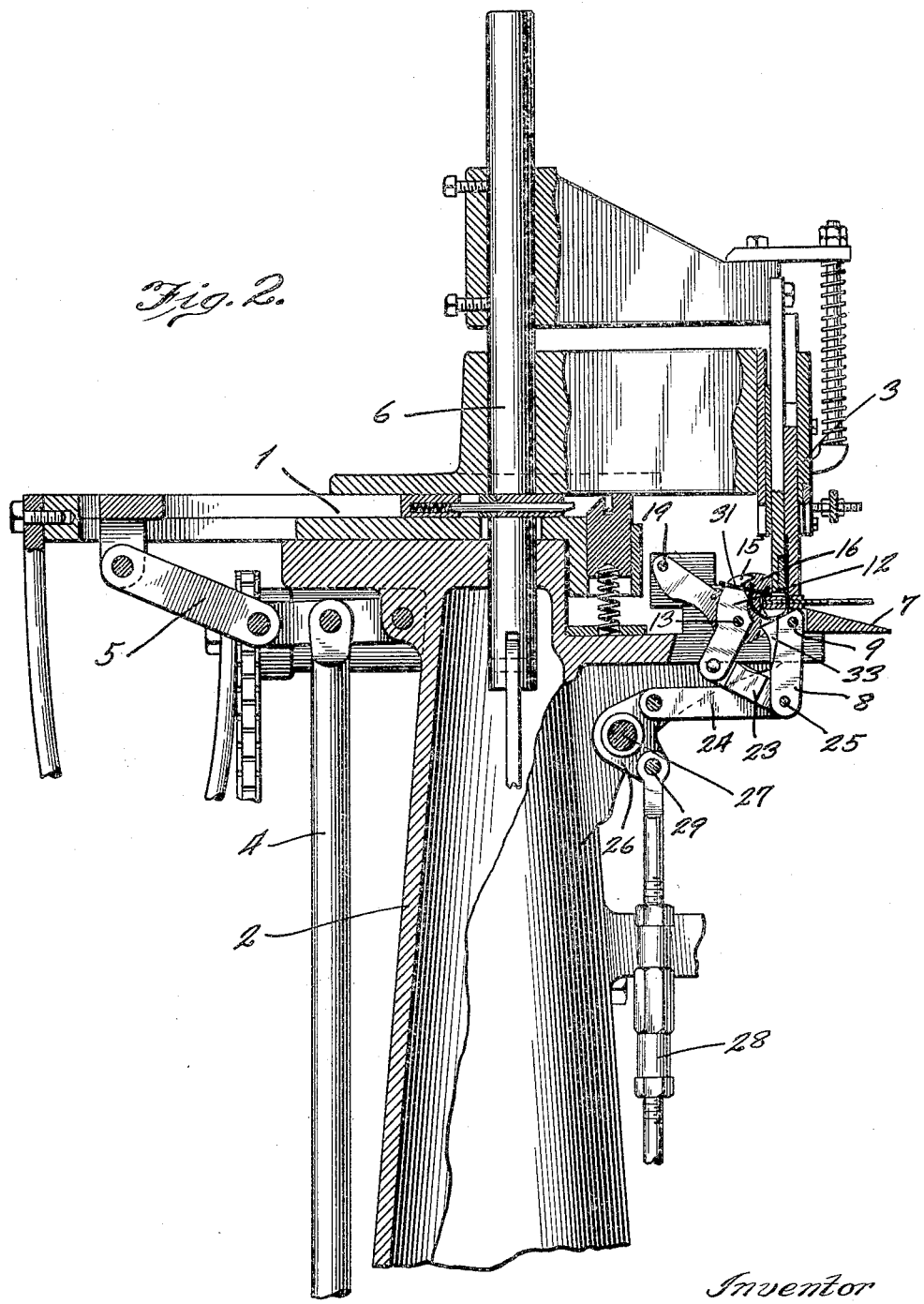
Fig. 2 is a vertical longitudinal section of said machine.
Figure 3:
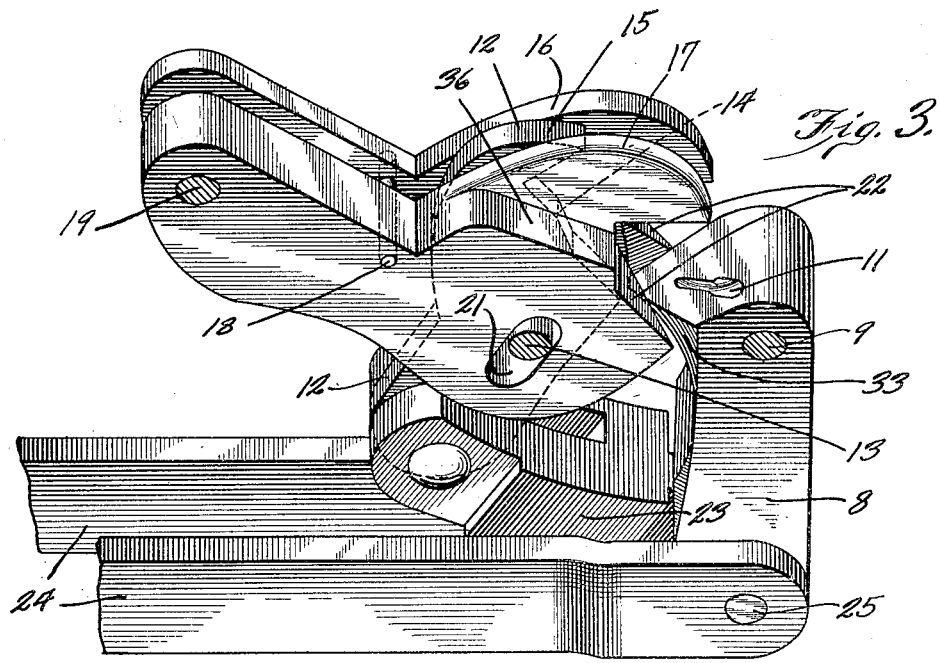
Fig. 3 is a perspective of certain portions of the handle clinching mechanism.

As thus illustrated, the mechanism 1 at the top of the body 2 of the machine, for cutting off and bending a portion of the wire into bail-shaped form, may be of any suitable known or approved form, being common and well known. Handle driving mechanism 3 is provided at the front of the machine, for taking the bail-shaped wire blank and bending the ends thereof at right angles, and for then inserting these bent end portions through the rim of the basket. It will be understood that power devices (not shown) are employed to communicate power through the connections 4 and 5 to operate the mechanism 1, in the usual and well-known manner, and to the vertically reciprocating rod 6 to operate the mechanism 3 in the usual and well-known manner.

The mechanism for bending and clinching the handle ends, constituting the invention in this case, comprises a basket support 7 upon which the rim portion of the basket is supported during the handle inserting and clinching operation. A pivoted clinch block or clincher 8 is pivoted at 9 in a slot 10 in said basket support 7, this clincher having its upper end provided with a groove 11 to receive the handle end portion. There are two clinchers, like the clincher 8, of course, one for each handle end, similarly mounted in the said basket support. There are also two pivoted clinchers 12 pivoted at 13 in the slots in the basket support 7, each clincher 12 having a wire deflecting portion 14, and a final clinching end portion 15, as shown in Figs. 3, 4, 5, 6, and 7 of the drawings. It will be seen that each clincher 12 is disposed between the two sections 16 and 17 of the guide for properly directing the end portion of the wire upwardly and over the edge of the basket rim, during the driving and clinching operation. The two sections 16 and 17 are connected together by a pin 18, so that they move in unison, and are pivoted at 19 on a stationary portion of the machine. There are four of these sections, such as the sections 16 and 17, two for each clincher 12, and the guides formed by these sections are held normally in raised position by the spring 20 shown in Fig. 1 of the drawings. The sections have slots 21 through which the pivot 13 extends, so that these sections are free to move downward when the edge of the basket rim is shoved against their shoulders 22, this pressure causing the guides to move downward against the rim of the basket, as shown in Figs. 5, 6, and 7 of the drawings. Links 23 connect the lower ends of the clinchers 8 with the lower ends of the clinchers 12, and links 24 connect the pivots 25 with the upper end of the bell crank 26, which latter is pivoted at 27 on a stationary portion of the machine. A vertically reciprocating rod 28 is pivoted at 29 to the other arm of said bell crank, whereby vertical reciprocation of this rod will cause the operation of the clinchers 8 and 12 in the desired manner. Any suitable power means can be employed for reciprocating the rod 28 to cause the operation of the clinching mechanism thus provided.

In operation, it will be seen that the handle ends are inserted as shown in Fig. 6, the ends first encountering the clinchers 8, which deflect the wire in the manner shown, and the deflected wire ends then encounter the portions 14 of the clinchers 12, and the sections 16 and 17 serve to then guide the wire ends upwardly. It will be seen that the sections 16 and 17 bear at opposite sides of the wire ends upon the basket rim, and hence it is necessary to have space between the final wire ends 30 and the legs or side portions 31 of the handle, which side portions are connected together by the transverse top portion 32 of the handle. Looking at Fig. 3, it will be seen that the clincher 8 is tapered at 33 to fit snugly between the beveled portions 22, to insure effective relation between the parts of the clinching mechanism. When the wire has been bent in the manner shown in Fig. 6 of the drawings, the clinching mechanism is then operated to actuate the clinchers 8 and 12 in the manner shown in Fig. 7 of the drawings, thus flattening the wire portions 34 against the under side of the rim, and flattening the final end portions 30 against the top side of the rim, which in this case is the outer side of the rim.

Figure 4:
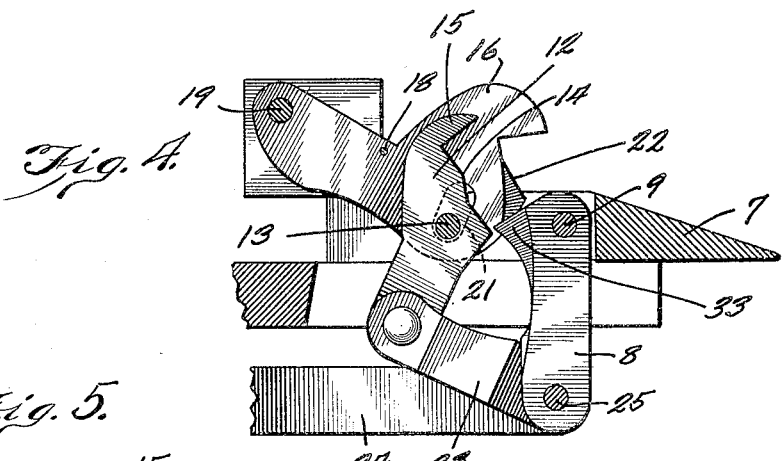
Fig. 4 is a side elevation of the elements shown in Fig. 3, on a smaller scale, showing the parts in certain positions.
Figure 5:
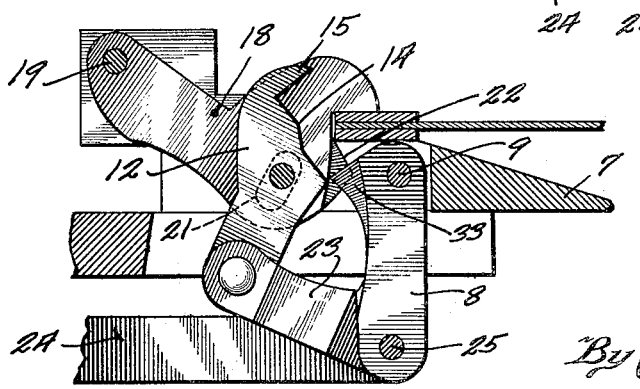
Fig. 5 is a similar view, showing the parts in different positions.

When the basket is removed, the parts return to their normal positions, with the guides 16 and 17 in raised position, as shown in Figs. 1 and 4 of the drawings, ready to receive the next basket, or to receive the opposite rim portion of the same basket.

Thus the clinching mechanism is of such character that the wire is accurately guided, during the progress of the bending of the wire around or over the rim of the basket, and the handle is effectively secured to the basket rim. A handle of this kind, of course, can be bent outwardly and then back again, as in attaching a basket cover, without loosening the handle in its bearings in the basket rim, and without danger of injuring the fruit or other contents of the basket. This is because the inside portions of the handle are not disturbed by such manipulation of the handle, but remain stationary in their fixed positions.

During the insertion of the handle, it will be seen that the portion 32 rests upon the shoulder 35, while the legs or side portions 31 of the handle rest upon the shoulders 36 of the guide plates 17. In this way, it will be seen that the handle is given a slight bend outwardly, so that the side portions 31 incline outwardly, instead of being exactly vertical.

What I claim as my invention is:

1. In a machine for attaching wire handles to baskets, by bending a length of wire into bail-shaped form, then bending the handle ends at right angles, and then inserting the bent handle ends through the basket rim, at one and the same side of the basket, the combination of clinchers for deflecting the wire ends toward the upper edge of the basket rim, during the insertion of the end portions through the rim, other clinchers for thereafter deflecting and bending the end portions over the upper edge of the basket rim and against the other side of the rim, in spaced relation at the one side of the basket, and guides for guiding the wire ends finally into position against the basket rim side.

2. A structure as specified in claim 1, said guides being pivoted to move into operative position when the basket rim is presented in position to receive the handle.

3. A structure as specified in claim 1, said guides being pivoted to move toward and away from the basket rim, and being operable by pressure of the basket rim to move into operative position.

4. A structure as specified in claim 1, said guides being pivoted to move toward and away from the basket rim, and being operable by pressure of the basket rim to move into operative position, together with spring means for holding said guides in normal position.

5. A structure as specified in claim 1, said second-mentioned clinchers having a pivot, said guides being pivoted at one end thereof, and each guide having a slot for said pivot, whereby said guides have movement about their own pivot relatively to said clincher pivot.

6. A structure as specified in claim 1, said guides comprising a pair of plates for each handle end, the plates of each pair being spaced apart to accommodate one of said second-mentioned clinchers between them.

7. A structure as specified in claim 1, said guides comprising a pair of plates for each handle end, the plates of each pair being spaced apart to accommodate one of said second-mentioned clinchers between them, said first-mentioned clinchers being each tapered to extend between the adjacent pair of plates.

8. A structure as specified in claim 1, said guides being formed with spaces to accommodate the second-mentioned clinchers therein.

9. A structure as specified in claim 1, said guides being pivoted and disposed in position to space the wire ends a distance from the legs or side portions of the handle.

10. A structure as specified in claim 1, each guide comprising a pair of plates spaced apart and pivoted at one end thereof, with a pin connecting the plates of each pair together, and spring means serving to maintain said guides in normal position to receive the basket rim, said guides being adapted by pressure of the basket rim to move into operative position.

11. A structure as specified in claim 1, comprising links connecting said first-mentioned clinchers with said second-mentioned clinchers, and power transmitting connections for actuating said clinchers, each guide embracing one of said second-mentioned clinchers.

12. A structure as specified in claim 1, said guides comprising plates some of which are provided with shoulders forming a support for the legs or side portions of the handle, during the attaching operation.

13. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of basket rim and against the other side of the rim, and guides for guiding the wire ends into position against the basket rim side, said second-mentioned clinchers having a pivot, said guides being pivoted at one end thereof, and each guide having a slot for said pivot whereby said guides have movement about their own pivot relatively to said clincher pivot.

14. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, said guides comprising a pair of plates for each handle end, the plates of each pair being spaced apart to accommodate one of said second-mentioned clinchers between them.

15. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, said guides comprising a pair of plates for each handle end, the plates of each pair being spaced apart to accommodate one of said second-mentioned clinchers between them, said first-mentioned clinchers being each tapered to extend between the adjacent pair of plates.

16. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, said guides being formed with spaces to accommodate the second-mentioned clinchers therein.

17. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, each guide comprising a pair of plates spaced apart and pivoted at one end thereof, with a pin connecting the plates of each pair together, and spring means serving to maintain said guides in normal position to receive the basket rim, said guides being adapted by pressure of the basket rim to move into operative position.

18. In a machine for attaching wire handles to basket, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, comprising links connecting said first-mentioned clinchers with said second-mentioned clinchers, and power transmitting connections for actuating said clinchers, each guide embracing one of said second-mentioned clinchers.

19. In a machine for attaching wire handles to baskets, by bending a length of wire into bail-shaped form, then bending the handle ends at right angles, and then inserting the bent handle ends through the basket rim, the combination of clinchers for deflecting the wire toward the edge of the basket rim, other clinchers for deflecting and bending the wire ends over the edge of the basket rim and against the other side of the rim, and guides for guiding the wire ends into position against the basket rim side, said guides comprising plates some of which are provided with shoulders forming a support for the legs or side portions of the handle, during the attaching operation.

20. In a machine for attaching wire devices to basket rims, by bending a length of wire into bail-shaped form, and by then inserting the wire end portions through the rim, to provide projecting wire end portions, the combination of driving means for inserting the wire end portions through the rim, to provide wire end portions long enough to be bent over the edge of the rim and then down upon the other side thereof, and devices co-operating with said means to deflect the wire end portions toward and across the upper edge of the rim, adapted and operative to thereafter bend the wire end portions tightly against the one side of the rim and against the upper edge of the rim, and finally against said other side of the rim, said devices being adapted to space the wire ends a distance from the side portions of the bail-shaped device.

21. A structure as specified in claim 20, said devices being operative to space the wire ends a distance apart between the side portions of the wire device.

22. A structure as specified in claim 20, said driving means being adapted to insert the wire ends inwardly through the rim, whereby said devices are then operative to position the final ends of the wire on the outer side of the rim.

23. In a machine for attaching wire devices to basket rims, by bending wire into bail-shaped form and thereafter inserting the wire end-portions through the basket rim, the combination of means for inserting the wire end portions through the rim, to provide projecting end portions, devices for bending the projecting end portions flatwise against one side of the rim, and other devices for bending the wire end portions tightly against the upper edge of the rim and flatwise against the other side of the rim, said devices having means for clamping the rim in position before the final operation of said devices, whereby the bending of the wire end portions in the manner stated is accomplished while the rim is clamped in position not only by said driving means, but also by devices auxiliary to said deflecting and bending devices.

Specification signed this 21st day of August, 1931.

LESLIE M. HILE.